United States Patent
Crichlow

(10) Patent No.: US 6,999,567 B2
(45) Date of Patent: Feb. 14, 2006

(54) METHOD AND SYSTEM FOR COMMUNICATING FROM AN AUTOMATIC METER READER

(76) Inventor: Henry B. Crichlow, 716 Jona Kay Ter., Norman, OK (US) 73069

( * ) Notice: Subject to any disclaimer, the term of this patent is extended or adjusted under 35 U.S.C. 154(b) by 9 days.

(21) Appl. No.: 10/710,976

(22) Filed: Aug. 16, 2004

(65) Prior Publication Data

US 2005/0041790 A1 Feb. 24, 2005

Related U.S. Application Data

(60) Provisional application No. 60/495,939, filed on Aug. 19, 2003.

(51) Int. Cl.
*H04M 11/00* (2006.01)
(52) U.S. Cl. ............................ 379/106.06; 387/106.03; 702/62; 705/63; 340/870.02
(58) Field of Classification Search ................. 379/106.01–106.11; 702/62; 705/63; 340/870.01, 340/870.02
See application file for complete search history.

(56) References Cited

U.S. PATENT DOCUMENTS

| 4,833,618 | A | * | 5/1989 | Verma et al. | ........... 379/106.04 |
|---|---|---|---|---|---|
| 4,847,892 | A | * | 7/1989 | Shelley | ................. 379/106.06 |
| 5,239,575 | A | * | 8/1993 | White et al. | ........... 379/106.06 |
| 6,487,282 | B1 | * | 11/2002 | Xia et al. | .............. 379/106.03 |

\* cited by examiner

*Primary Examiner*—Wing Chan
(74) *Attorney, Agent, or Firm*—Richard D. Fuerle

(57) ABSTRACT

In a system where an automatic meter reader device communicates with a host at a remote location using a communication line that is shared with at least one other user, conflicts between the use of the communication line by the automatic meter reader and/or by the host are minimized. When the line is used by other users, information about the times they use the line is collected. That information is analyzed to identify time periods when the communication line is less likely to be used by the other users. The automatic meter reader and the host are then directed to communicate with each other during those time periods.

20 Claims, 8 Drawing Sheets

| Hour | Calls |
|------|-------|
| 1 | 0 |
| 2 | 0 |
| 3 | 0 |
| 4 | 0 |
| 5 | 1 |
| 6 | 1 |
| 7 | 3 |
| 8 | 1 |
| 9 | 0 |
| 10 | 0 |
| 11 | 0 |
| 12 | 2 |
| 13 | 0 |
| 14 | 0 |
| 15 | 1 |
| 16 | 4 |
| 17 | 5 |
| 18 | 3 |
| 19 | 2 |
| 20 | 2 |
| 21 | 1 |
| 22 | 0 |
| 23 | 0 |
| 24 | 0 |
| Total | 26 |

Fig. 2

| Hour | Day 1 | Day 2 | Day 3 | Day 4 | Day 5 | Day 6 | Day 7 | Day 8 | Day 9 | Day 10 | Day 11 | Day 12 | Day 13 | Day 14 | Day 15 | Day 16 | Day 17 | Day 18 | Day 19 |
|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 1 | 0 | 1 | 0 | 1 | 1 | 0 | 0 | 1 | 0 | 1 | 0 | 1 | 0 | 1 | 1 | 0 | 0 | 1 |
| 6 | 1 | 1 | 0 | 1 | 0 | 0 | 0 | 0 | 1 | 1 | 1 | 1 | 1 | 1 | 0 | 0 | 0 | 0 | 1 |
| 7 | 3 | 5 | 3 | 2 | 2 | 3 | 0 | 0 | 3 | 2 | 3 | 4 | 2 | 2 | 2 | 3 | 0 | 0 | 3 |
| 8 | 1 | 1 | 2 | 1 | 0 | 1 | 0 | 0 | 1 | 1 | 1 | 1 | 1 | 1 | 0 | 1 | 0 | 0 | 1 |
| 9 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 |
| 12 | 2 | 3 | 0 | 2 | 1 | 2 | 0 | 0 | 2 | 2 | 1 | 2 | 1 | 2 | 1 | 2 | 0 | 0 | 2 |
| 13 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 |
| 15 | 1 | 1 | 1 | 1 | 1 | 1 | 0 | 0 | 1 | 1 | 1 | 1 | 1 | 1 | 1 | 1 | 0 | 0 | 1 |
| 16 | 4 | 2 | 4 | 2 | 4 | 3 | 0 | 0 | 4 | 4 | 3 | 4 | 3 | 2 | 4 | 3 | 0 | 0 | 4 |
| 17 | 5 | 4 | 3 | 5 | 3 | 3 | 0 | 0 | 5 | 5 | 6 | 5 | 3 | 5 | 3 | 3 | 0 | 0 | 5 |
| 18 | 3 | 2 | 3 | 2 | 2 | 2 | 0 | 0 | 3 | 1 | 3 | 2 | 3 | 2 | 2 | 2 | 0 | 0 | 3 |
| 19 | 2 | 2 | 1 | 2 | 2 | 2 | 0 | 0 | 2 | 1 | 2 | 3 | 2 | 2 | 2 | 2 | 0 | 0 | 2 |
| 20 | 2 | 2 | 2 | 2 | 2 | 2 | 0 | 0 | 2 | 1 | 2 | 1 | 2 | 2 | 2 | 2 | 0 | 0 | 2 |
| 21 | 1 | 1 | 0 | 1 | 1 | 1 | 0 | 0 | 1 | 1 | 1 | 1 | 1 | 1 | 1 | 1 | 0 | 0 | 1 |
| 22 | 0 | 0 | 0 | 0 | 0 | 0 | 0 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 | 0 | 0 | 0 | 0 | 0 | 0 |

Fig. 3

METHOD AND SYSTEM FOR COMMUNICATING FROM AN AUTOMATIC METER READER

CROSS REFERENCE TO RELATED APPLICATIONS

This application claims priority from provisional application No. 60/495,939, filed Aug. 19, 2003 by Dr. Henry Crichlow. This application is related to application Ser. No. 10/016,049, filed Dec. 12, 2001, application Ser. No. 10/033,667, filed Dec. 27, 2001, Disclosure Document DD516,218, filed Jul. 31, 2002, provisional application 60/475,240, filed Jun. 2, 2003, provisional application 60/474,851, filed Jun. 2, 2003, and utility application publication no. US2002/0018545 A1, published Feb. 14, 2002.

BACKGROUND OF INVENTION

This invention relates to a method and system for communicating between an automatic meter reader (AMR) and a remote location over a non-dedicated communication line. In particular, it relates to a method and system in which data on competing uses of a communication line are collected, the data is analyzed to determine the times of minimal usage, and information is transmitted between an AMR and a remote location during those times.

Meters are used by the electric power, gas, and water supply industries to measure the quantity of a commodity that is consumed at a particular location. While meters may be read manually by a human meter reader who goes to each meter, this is an inefficient procedure and is gradually being replaced by AMR that transmit usage information to a remote location. If the meter is read using an AMR, a single dedicated communication line is usually required to allow the meter system to function efficiently. In such systems, the AMR is the only user of the communication line and is able to connect directly at any time with the host network.

Chartwell (The Chartwell AMR Report, 2000 5$^{th}$ edition, Chartwell Inc., 2964 Peachtree Rd, NW Suite 250, Atlanta, Ga. 30305), shows a comparative industry survey of all the major existing energy management companies in the United States, including ITRON, DCSI, HUNT, and SEMPRA, and indicates that most of them use a dedicated telephone system to communicate between their energy meters and their host computer systems. The cost of having a second dedicated telephone line is about $20 monthly for minimal basic service; for businesses it can be much more. Since the Federal Communications Commission (FCC) has determined that there are in excess of 105 million households in the United States (over 94 percent of all households) with phone lines, the annual cost of that number of dedicated lines would be in the billions of dollars, which would, of course be included in the cost of electrical service.

Numerous inventions have been proposed for the utility metering industry that focus on various communication problems between AMR devices and remote locations.

NERTEC Inc. of Quebec, Canada (www.nertec.com) provides a telereader AMR device which shares a customer telephone line and calls in at preprogrammed times to the AMR station to report the electric usage data.

U.S. Pat. No. 4,707,852 teaches a method in which message transmission between the AMR device and the host is initiated at random times by a random generator algorithm within a microprocessor at the device.

In U.S. Pat. No. 4,833,618, a system is described for storing utility data and then transmitting the data from the user premises at pre-determined times via a telephone connection.

Patent application publication no. US2001/0010032A1 provides a very complicated energy management system, which encompasses a local area network, control modules and various sensors all controlled by computers, which communicate with the utility system by a variety of communication modes.

U.S. Pat. No. 4,540,849 provides a meter interface unit, which allows the automatic reading of the utility usage at the telephone office in response to an interrogation request from the telephone control office. This system sends the meter data to the central telephone office when the subscriber's phone line is on-hook.

U.S. Pat. No. 4,642,635 publishes the use of a two tone oscillators to read stored utility data over the phone lines. An inhibit circuit is used to inhibit the use of the line when the phone is in use or when there disturbances on the line.

In U.S. Pat. No. 4,847,892, a clock is used to trigger a connection with the central utility computer to transfer the AMR information. The AMR device has circuitry built-in, which distinguishes the ringing signal from the central unit as opposed to a typical voice phone call. If there is no specific ring signal, it is assumed that it is a normal customer call and the AMR device does not answer.

U.S. Pat. No. 6,163,602 provides for a rather complex system in which utility AMR data is combined with a system based on the telephone billing system to form an integrated system for unified billing of telephone and utility consumption metering.

U.S. Pat. No. 5,425,087 provides a scheme and method to monitor telephone usage in real time and to use this data in the management of a telephone network.

U.S. Pat. No. 6,542,729 combines the accumulated historical usage of a cell phone customer and its current use using statistical and pattern analysis to determine whether the current use is fraudulent.

In U.S. Pat. No. 5,155,763, telephone call centers use neural networks and other analytical means to automatically determine slow and fast periods of the day, week, month, and year for telephone solicitation calls based on prior calling data results.

U.S. Pat. No. 6,327,345 promotes the use of risk analysis and past calling history to develop a model to control fraudulent telephone calls.

In U.S. Pat. No. 6,240,291 B1, a neural network technique is described to hand off cell phone transmissions between cell towers based on a pattern recognition algorithm using the current signals emanating from mobile phones and the historical signals stored in a database to decide whether to handoff or not.

SUMMARY OF INVENTION

In this invention, a unique and innovative method and system is used that enables the existing estimated 265,000,000 utility electric meters to gain access to various communication networks, such as the internet and world wide web, using a common existing phone line or other communication line at the meter site which is not dedicated for the use by an AMR device. In one aspect of the invention, a method is provided for determining call-in or communicating times in an AMR network comprising a plurality of host computers and the AMR devices.

In this invention, an algorithm may be used to analyze the historic phone usage on the communication line, determine when the primary user of the line is using the line, and select off periods or non-conflict periods for use of the communication line by the AMR device. By implementing this invention, each new meter or existing meters can more effectively utilize the telephone or other communication system without the added cost of a dedicated line to perform the communication functions. This invention significantly reduces the need for dedicated phone lines in AMR communications networks, thereby improving service and performance and reducing costs. Also, meters that are not equipped with an AMR device can be upgraded with a retrofitted AMR device without adding a separate communication line. The invention requires a small, inexpensive device that can be installed by non-specialized personnel without major capital expenditures.

An object of this invention is to provide an improved energy usage meter by allowing the meter system to communicate with the host by using a single non-dedicated phone line only at the times that are determined to create the least conflict with the primary user at that physical location.

A more specific objective is to provide an improved means of accommodating the new electronic devices which are being developed for automatic meter reading with the ability to communicate with the central host system in a manner that does not create potential societal and economic problems for the primary user, such as limiting phone use, or requiring additional costs.

Another specific objective of this invention is to provide a means of retrofitting existing meters with this technology such that the existing dedicated phone line and its attendant costs are no longer incurred by the user.

A further objective is to increase the effectiveness of the AMR operation such that data and information can be transferred from the meter to the host system more reliably.

Another specific objective is to provide a complete system where the AMR function can be made more user friendly by providing a system which does not cause the customer to become aggravated by the continuing existence of busy or conflict modes.

Another specific objective is to provide a novel system where the AMR device can be an integral part of the owner's system in an unobtrusive manner like a fax machine or other communication device.

Another specific objective is to implement an improved means of increasing the meter's capability without decreasing its reliability and meter functionality.

Another objective is to utilize accepted algorithmic processes in such a manner without having to modify the existing operation of the meter and its host.

Another specific objective is to minimize the cost of retrofitting existing meters or fitting new meters by using readily available technologies in a new and different manner to obtain the best windows of opportunity for calling in to the host system.

Another specific objective is to use embedded algorithmic modules in the AMR device to perform the execution phase of the pattern recognition process. Other objects and advantages of this invention will hereinafter appear.

BRIEF DESCRIPTION OF DRAWINGS

FIG. 2 is a chart giving an example of the number of calls in each hour of the day for a home.

FIG. 3 is a table giving an example of the number of calls in each hour over a nineteen day period.

DETAILED DESCRIPTION

Figure 1:
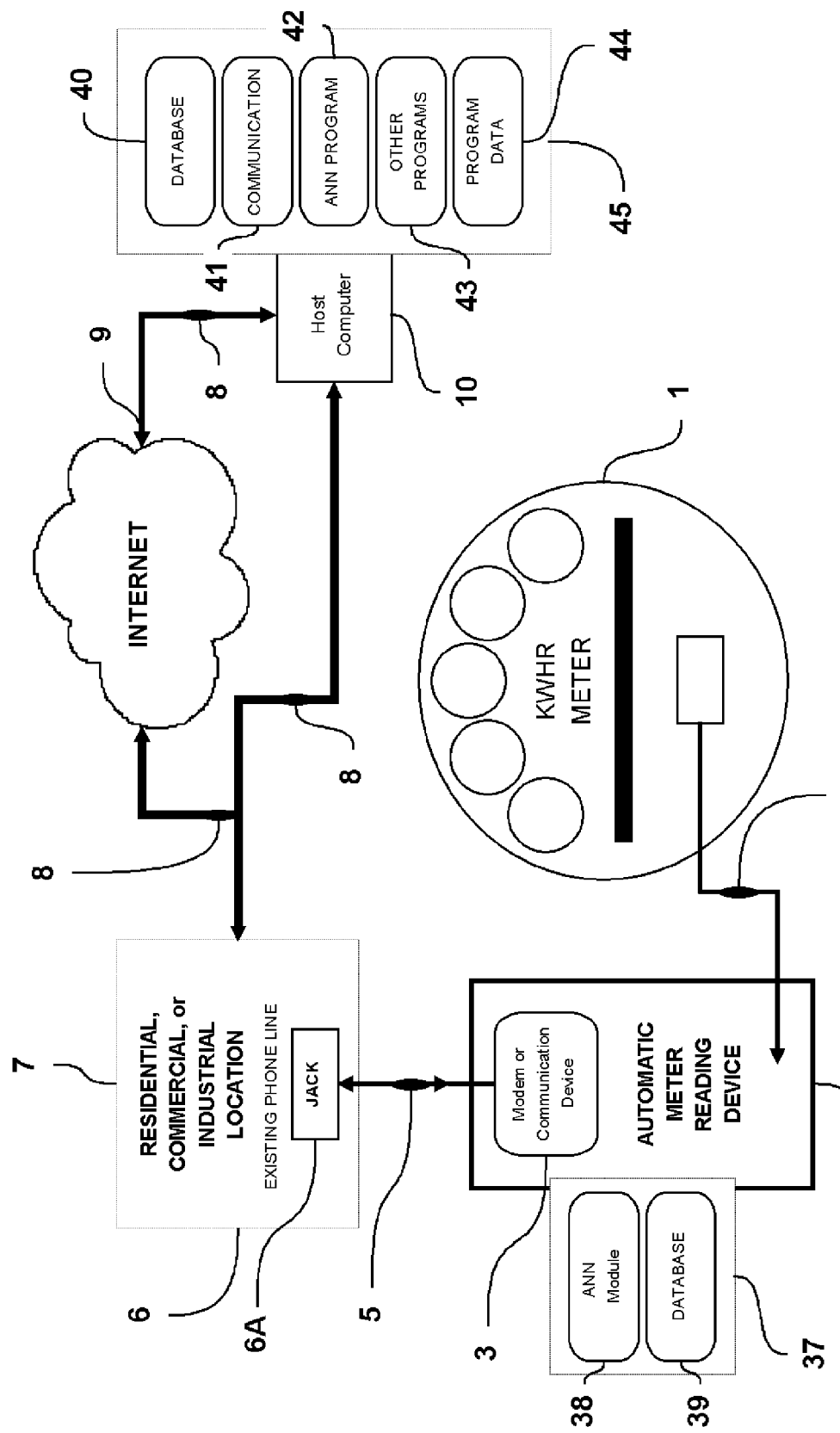
FIG. 1 is a schematic diagram of a typical AMR device connected to an energy meter and to the phone system.

AMR devices at the site of a meter communicate information to a host at a remote site and receive information from the host using a communication line. The host is typically the utility company's computer, but other types of hosts may also be used. The host may be connected to the internet and/or to the world wide web.

The communication line may be a telephone line, a cellular system, a cable TV system (CATV), a digital subscriber line (DSL), a pager system, a radio broadcast, or other type of communication line; telephone lines are preferred. This invention, however, applies only to those communication lines that are shared, i.e., the communication line is not dedicated solely to communications between the AMR device and the host. In other words, at least one other user also transmits information over the same communication line and, when another user is transmitting over the line, that usage conflicts with the use of the line by the AMR device and/or the host, so that at least one of the transmissions is in some way disrupted. If the communication line is a telephone line that is a party line, there may be several other users on the line.

The Federal Communications Commission (FCC) has published statistics on use of telephones by residential and commercial users in the US (see Trends in Telephone Service, March 2000, Industry Analysis Division, Common Carrier Bureau, Federal Communications Commission, Washington, D.C. 20554). By analyzing the Dial Equipment Minutes (DEM) of these users it is seen that the average household phone usage is about 110 minutes per day per household. There are 1440 minutes in a day and the phone is therefore available for about 92% of the time for use by an AMR device, assuming that this device knows when other users are likely to be using the line. This invention identifies those time periods that are least likely to create a conflict with other users of the communication line and requires the AMR device to use those time periods. Telephones (or communication lines) at a given location are generally used intermittently and non-randomly and, as such, a well-defined daily pattern of use exists in the vast majority of cases that is repeated, usually each day and each week. In this invention, those patterns are recognized by using, for example, a pattern recognition algorithm. Communications to and from the AMR device are then scheduled for those times when there is less chance of a conflict between the AMR device and other users of the line.

In the first step of the method of this invention, information is collected on the use of the communication line by other users, preferably both calls they make and calls they receive. This information may be collected by, for example, monitoring all of the calls on the communication line and recording the time and date that each call begins and ends. Technology for doing this exists and is commercially available. Alternatively, only outgoing calls or only incoming calls may be monitored. While complete data on the usage of the line by all the parties would be the best information for analysis in that more accurate predictions of future use could be made from it, some people may object to the collection of this information as a violation of their privacy, despite the fact that the numbers called and the numbers of the calling parties would not be collected and the fact that a more detailed history of calls made and received is available from the telephone company. If a party objects, the information collected could be limited to only usage of the line by the AMR device and its host, noting the time and date of each call and attempted call made to the AMR device, or made by the AMR device, and whether the line was open or was being used by another user. Other ways of collecting information on the use of the line by others are also contemplated. The information that is collected is recorded and forms an historical record. The information is preferably collected and recorded by the AMR device, but this could also be done by the host or by a third party.

In the second step of the method of this invention, the information collected in the first step is analyzed to determine at what times the line is least used by others, using an algorithm or a group of algorithms. The analysis is preferably performed on a computer system at the host location as it is likely to have superior computational capabilities, but it could also be performed by the AMR device at the meter location. If it is performed at the host location, the results of the analysis may then be transmitted by the host to the AMR device at the meter site.

The analysis may be simply counting the number of calls by other users in every time slot in a day, then selecting the time slot or slots in which there were the least number of calls. More sophistication may be added by performing the analysis separately for each day of the week. However, the analysis is preferably performed by a pattern recognition program, which are well-known, commercially available, and are part of standard mathematical analysis. Examples of pattern recognition models include neural networks, fuzzy logic, hidden Markov models, and Bayesian analysis. More preferably, the pattern recognition program is a learning program, which improves its accuracy in predicting future use of the line as more data is accumulated. In a preferred pattern recognition learning program, an automated neural network (ANN) is used to determine the calling pattern on the communication line. Automatic neural networks (ANN), sometimes called artificial neural networks, are sophisticated mathematical modeling techniques that mimic the human brain, using a series of interconnected nodes or neurons. These nodes are connected by multiple paths, which conceptually allow the model to learn by emphasizing or de-emphasizing the connections between these nodes or neurons. Specialized computer programs reduce these models to their digital equivalent and have been successfully used in many applications in industry, commerce, and military operations. Repeated processing with a given ANN allows the network to learn from the data it processes; this is called the training phase. The learned process obtained from this training phase with the initial data can then be applied to other data sets for rapid and almost instantaneous analysis and predictions. Examples of neural networks programs may be found at Neural Network, "Introduction to Neural Networks, Jeanette Lawrence, California Software Scientific Press, Nevada City, Calif. 95959; Neural Networks, TRAJAN Software, 1999, Durham, DH2 3SR, England; and Neural Networks for Pattern Recognition, Christopher M. Bishop, Oxford University Press, ISBN 0198538642-2, 1995. The analysis is periodically updated by repeating the analysis using more recent data. Updated analysis are preferably performed once a week, but may be done more or less often and even continuously, if desired.

The analysis in the second step of this invention may be made under various constraints. For example, the AMR device may be required to transmit data on meter usage once every hour. If that constraint is applied, then each hour of usage may be analyzed to determine at which time during that hour the communication line is most likely to be unused. For example, if the communication line is a telephone line and the hour is prime time (8 to 11 PM), then the line may be used least during the times when commercials are not broadcast on television. If the AMR device is required to transmit a fixed number of times a fixed interval apart, only intervals meeting those requirements would be analyzed. Another constraint may be the amount of time that the AMR device requires to transmit the data. For example, if the AMR device requires a 15 second block of time and cannot break up its transmission into smaller blocks, then periods of non-use of less than 15 seconds may be excluded from the analysis, even if those periods are always free.

In the third step of the method of this invention, the results of the analysis performed in the second step are implemented. That is, the AMR device and the remote location that communicates with the AMR device are programmed to use the communication line only during those times found to be least used by other users and that met the requirements of any constraints. If there were no conflicts, then the AMR device and the remote location communicate at any convenient time. However, eventually conflicts are likely to arise and the times the line is used by the AMR device and the remote location will be altered accordingly.

In a preferred method of operation, the AMR device reads the meter in the usual manner to obtain usage of the commodity. At the same time, the AMR device attempts to call in to the host and provide the use data, based on some initial prescribed calling schedule. If the device has a conflict on the line, i.e., the line is busy, or the connection is interrupted by the customer going off-hook, or any other problem, the device notes this interrupt problem and logs the date and time. The AMR device returns to its regular schedule. Over the course of a time interval, which may be as short as a few days or long as a few weeks, enough data is collected on the calling patterns of the other users to allow the pattern recognition program to identify patterns of use and, if possible, supply a new calling sequence that conflicts less with the other users. The AMR device continues to monitor all conflict call situations and continues to update the calling pattern data, which is used to further revise the calling sequence on a regular schedule. Preferably, the AMR device is programmed to automatically immediately disconnect a call that it is making or receiving if another party attempts to use the line.

FIG. 1 is a generalized view of an AMR system. A typical meter installation consists of a meter 1, an AMR device 2 with a communication unit 3 connected to the existing phone system 6 through jack 6A in a premise or residence 7. AMR device 2 is connected by line 5 to phone system 6 and meter 1 is connected by line 4 to meter 1. These connections may be wireless, if desired. Phone system 6 forms part of the regular phone network 8, which allows connection to internet 9. Host computer 10 is available at the utility location or it may be at some other remote site available through regular communication channels 8, which can be any mode of communication.

Referring to FIGS. 2 and 3, a table of data 11 is shown which contains vector 13 (a list of information about calls made), indicating the hour of the day 12 and the number of call conflicts 13A in that period. Vector 13 may be modified to show more or less precision as needed. For example, the time parameter 12 may be as short as 15 minutes or as long as 4 to 6 hours, as needed.

FIG. 3 shows a larger database of call vectors over a longer period of time, in this example for 19 days. In FIG. 3, the historical usage pattern can be considered to be a series of hills and valleys, wherein the hills indicate times of high phone use and potential conflict situations and the valleys are times of low or non-existent phone use and potentially low conflict or conflict-free times. The AMR device connects to and communicates with the remote systems during these valleys.

Figure 4:
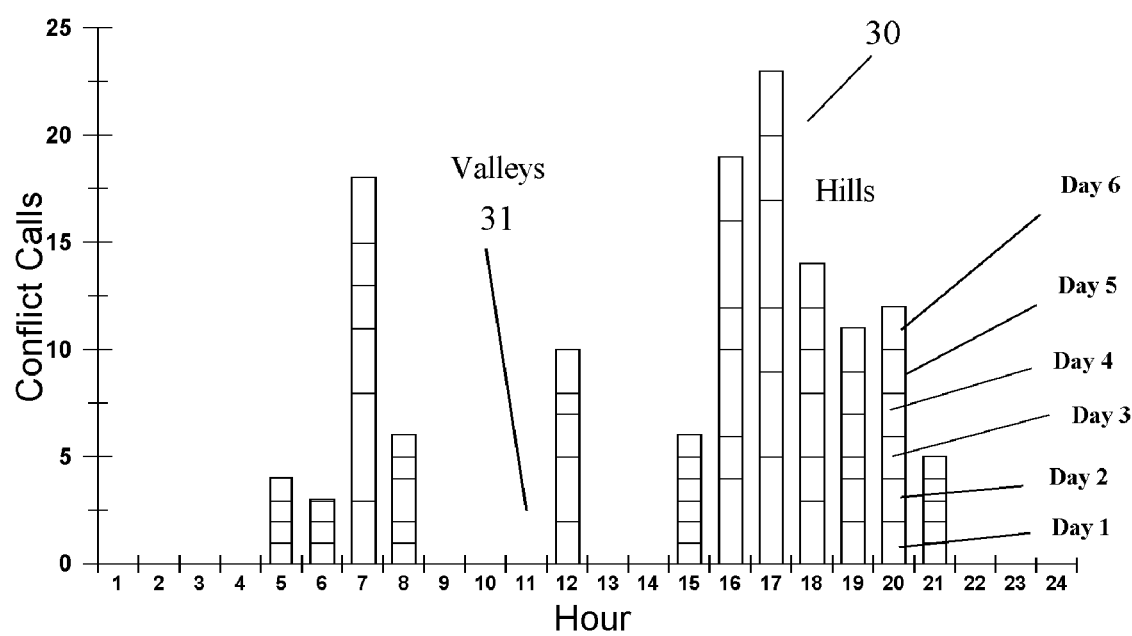
FIG. 4 is a graph summarizing the data given in FIG. 3.

FIG. 4 is a graphical illustration of the calling vectors over a 6-day period. The times during which conflicts occurred are shown as hills 30 and the times during which no conflict occurred are shown as valleys 31. The data shows the number of conflict calls on the vertical axis and the time of day on the horizontal axis. The invention uses these data vectors to determine by pattern recognition methodologies 15 (FIG. 5) which times it is best to connect the AMR device to the outside network over telephone line 6 (FIG. 1). This graph (FIG. 4) can just as easily show the total number of calls on an hourly basis or only the outgoing calls from the premise. In any case, the pattern recognition process can easily cope with the data provided.

Figure 5:
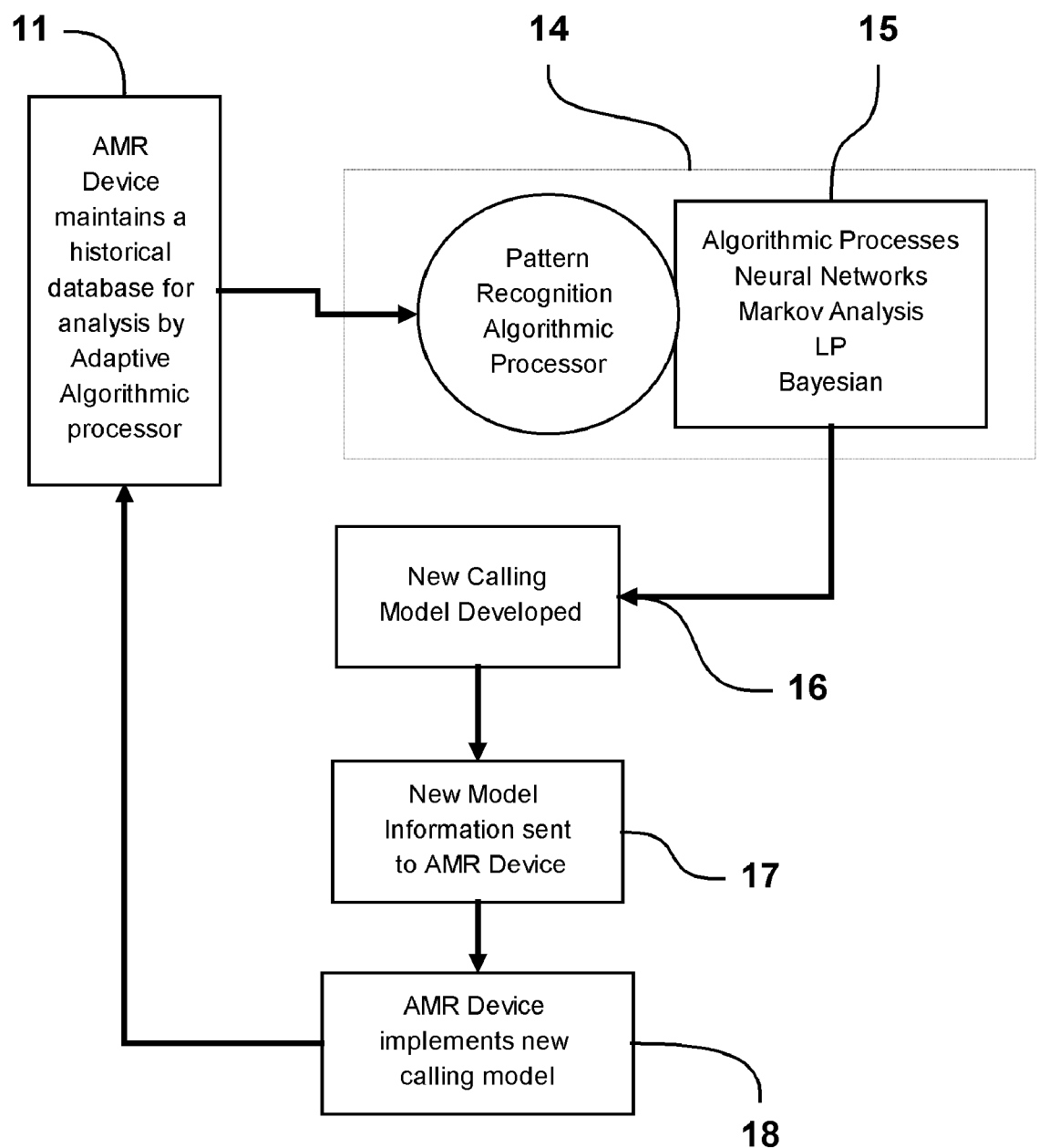
FIG. 5 is a block diagram illustrating the sequence of operations involved in this invention.

Referring to FIG. 5, the AMR device 2 maintains the historical call vector database 11. Pattern recognition processor 14 contains the algorithm(s) 15 that are used to process the call vectors from historical data 11. Pattern recognition processing 15, being a complex computing process, will normally be done on the larger host computer or server. However, it is possible to develop an embedded algorithm to allow the AMR device 2 to perform the computation of this pattern recognition function. This embodiment covers the use of the embedded system and the host computer is not needed for pattern recognition work. In action 16, the new calling model is developed. This new model is sent by action 17 to the AMR device 2, which implements action 18, the new sequence.

Figure 6:
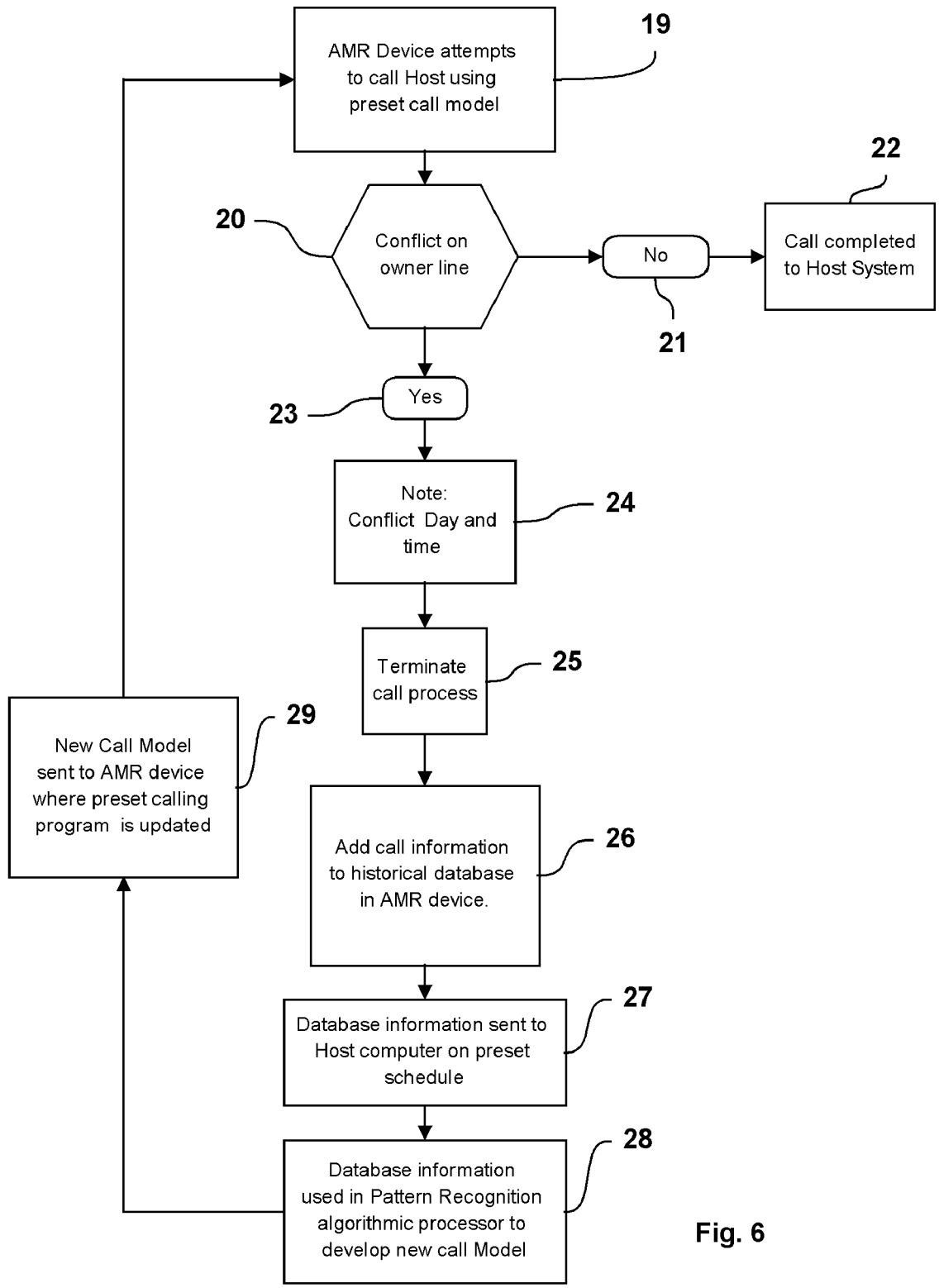
FIG. 6 is a block diagram showing the sequence of operations carried out by the AMR device in initiating a call through updating the call model.

Referring to FIG. 6, AMR device 2 starts action 19, which initiates a call to the host or remote computer. In action 20, the communication line is checked to determine if it is being used by another user. If there is no conflict 21, the call is completed to the remote machine by action 22. If there is a conflict, action 23, AMR device 2, by action 24, logs the conflict, noting the day, date, and time. Action 25 terminates the call and the call data is added to the historical database 11. The database information 11 is sent to host computer 10 at preset times where this information is used in the pattern recognition process by processor program 14 using algorithm(s) 15. New call model 29 is developed and this model is sent to AMR device 2 to update the calling model within the device. If, in an alternative embodiment, the call vector 11 is processed within the AMR device by an embedded algorithm 15, then the new call model 29 is updated within AMR device 2.

Figure 7:
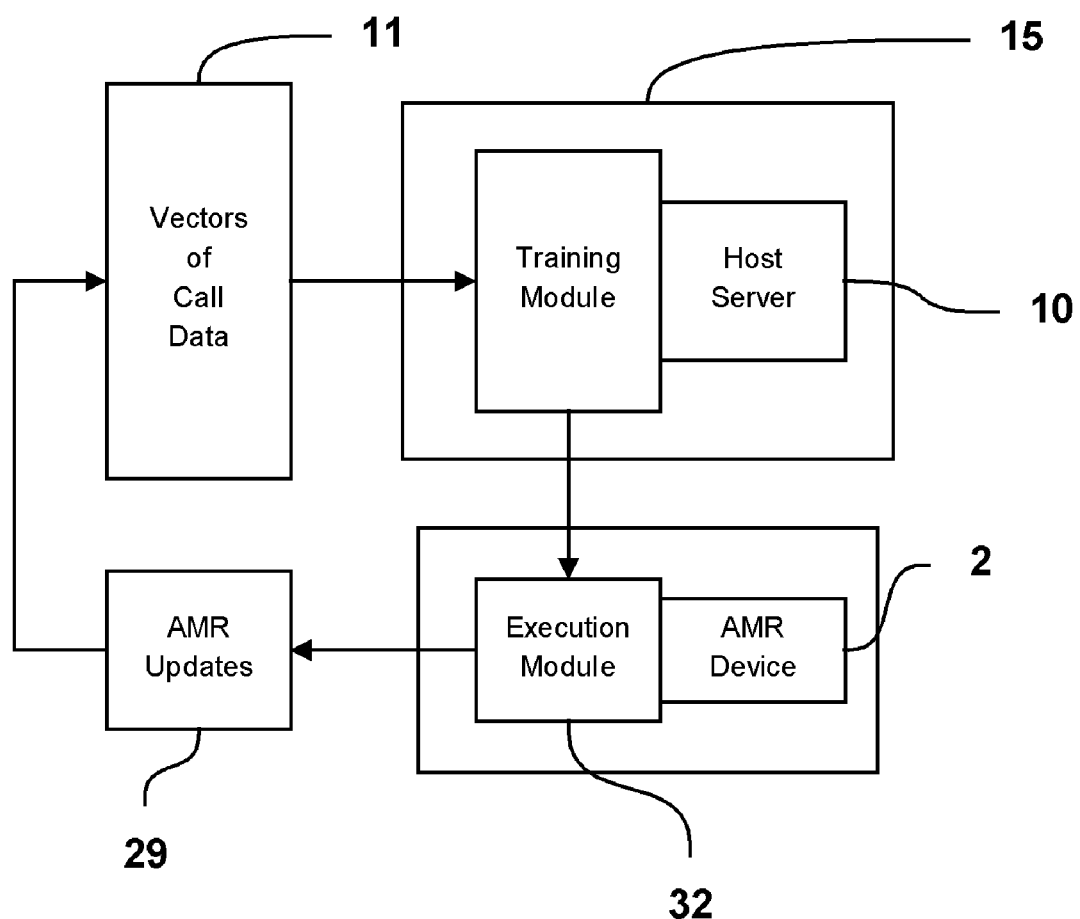
FIG. 7 is a block diagram showing the training and execution phases of the ANN model.

Referring to FIG. 7, the call sequence vector 11 is transmitted to the training module processor 15 containing the computer algorithm modules. The output from the processor 15 is then sent to the AMR device 2. The new call model 29 updates the AMR device 2 such that a new calling model is utilized for future calls.

Figure 8:
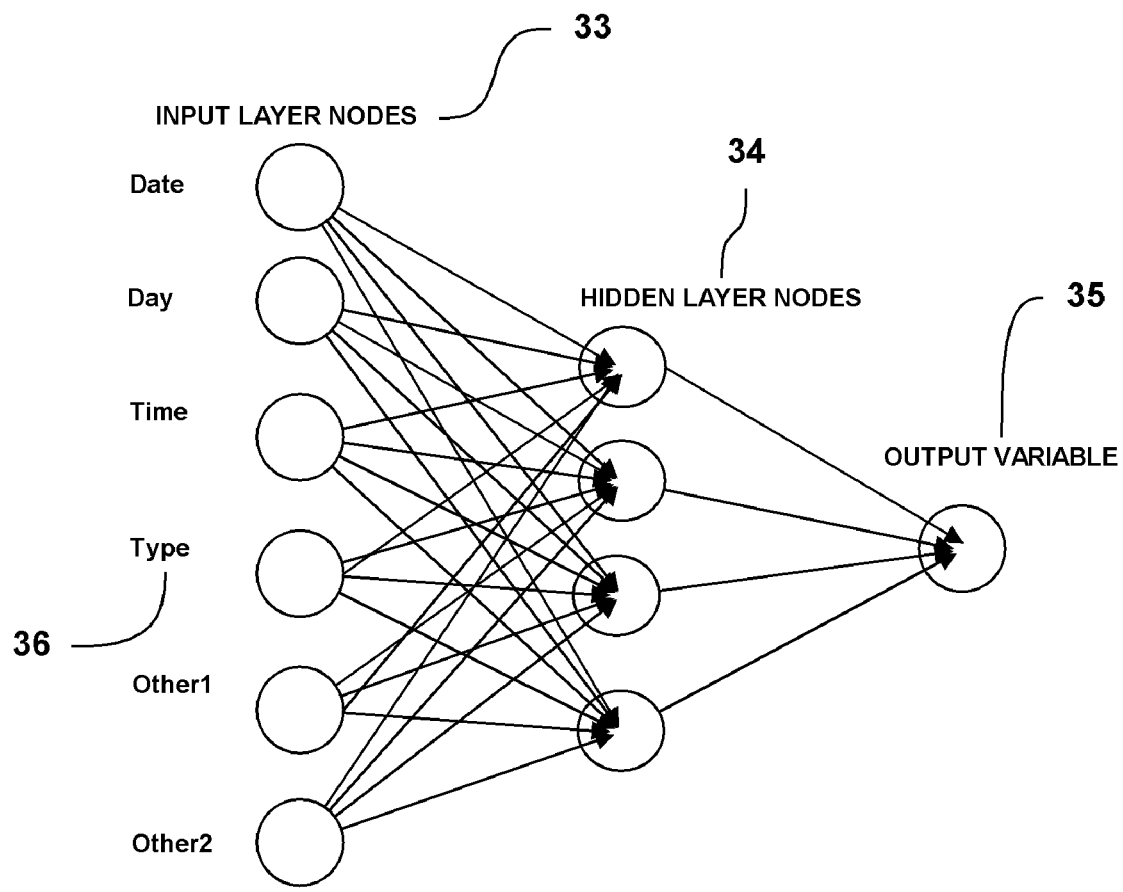
FIG. 8 is a diagram showing an automatic neural network (ANN) model layered structure.

FIG. 8 illustrates a typical ANN model of a pattern recognition program. This particular model comprises a set of three layers, an input layer 33, a hidden layer 34 and an output layer 35. Input variables 36 are a combination of variables that affect the calling pattern at the premises. Examples of variables that may be used include the date, the day of the week, whether it is a weekend or weekday, the month, time, and type of day (i.e., holiday, temperature, weather, family size, and demographics). The calling data vector 11 is used by the ANN model in the training phase to develop relationships from the historical data. After the ANN model is trained, the output layer 35 is used in the execution module 32 (FIG. 7) to determine which time periods are best to connect the AMR device to the communication line without conflicts.

The invention has been designed to be applied on a simple, reliable apparatus and the method of this invention is simple and uncomplicated. The method may include the following steps: (1) The AMR device is installed at the meter and is connected to the telephone system through a typical phone jack as shown in FIG. 1. The AMR device performs its routine AMR functions as required indifferent to the presence of the phone system.

(2) The AMR device calls the host computer using the initial call sequence provided on startup.

(3) The AMR device notes and logs all call data in a historical database as a set of vectors as shown in FIG. 2.

(4) When a sufficiently large database of calling data has been accumulated, this sufficient number being set initially by the operator, the AMR device sends this information to the host computer as shown in FIG. 6.

(5) The host computer, using a pattern recognition algorithms, such as ANN, computes the best calling sequence for future calls.

(6) The new calling model is then sent back to the AMR device and the calling program is updated for the future calls.

What is claimed is:

1. In a system where an automatic meter reader device communicates with a host at a remote location using a communication line that is shared with at least one other user, the improvement comprising
   (A) means for collecting information about the times when said communication line is used by said at least one other user;
   (B) means for analyzing said information to determine time periods when said communication line is less likely to be used by said at least one other user; and
   (C) means for directing said automatic meter reader device to communicate with said remote location during said time periods.

2. The improvement of claim 1 wherein said automatic meter reader device monitors electricity usage.

3. The improvement of claim 1 wherein said communication line is a telephone line, cable television modem, satellite communication, or radio frequency communication.

4. The improvement of claim 1 wherein said means for collecting information is located at the site of said automatic meter reader device.

5. The improvement of claim 1 wherein said means for collecting information collects information about every use of said communication line.

6. The improvement of claim 1 wherein said means for collecting information collects only information about the occurrence of conflicts in the use of said communication line.

7. The improvement of claim 1 wherein said means for analyzing said information is a program that counts calls in time slots throughout the day and identifies the slots with the least number of calls.

8. The improvement of claim 1 wherein said means for analyzing said information is an algorithmic pattern recognition processor.

9. The improvement of claim 1 wherein said means for analyzing said information is a learning program.

10. The improvement of claim 1 wherein said means for analyzing said information is an automatic neural network algorithm.

11. The improvement of claim 1 wherein said means for analyzing said information is located at said remote location.

12. The improvement of claim 1 wherein said information is analyzed subject to constraints on communications between said automatic meter reader device and said host.

13. The improvement of claim 1 wherein said means for directing said automatic meter reader is part of said automatic meter reader.

14. The improvement of claim 1 wherein said means for directing said automatic meter reader device also controls when said host communicates with said automatic meter reader device.

15. The improvement of claim 1 wherein said means for directing said automatic meter reader device terminates use of said communication line by said automatic meter reader device when another user comes on said line.

16. In a system where an automatic meter reader device reads electrical power usage and communicates about said usage to a host at a remote location using a telephone line that is shared with at least one other user, the improvement comprising (A) means for collecting information about the time and date when said communication line is used by said at least one other user;

(B) an algorithmic pattern recognition processor for analyzing said information to determine time periods when said communication line is less likely to be used by said at least one other user; and (C) means for directing said automatic meter reader device and said host to communicate with each other only during said time periods.

17. The improvement of claim 16 wherein said algorithmic pattern recognition processor is an automatic neural network algorithm.

18. A method of communicating between an automatic meter reader and a remote location over a communication line that is shared with at least one other user comprising (A) collecting information about the times of day when said communication line is used by said at least one other user;

(B) analyzing said information to determine time periods when said communication line is less likely to be used by said at least one other user; and (C) directing said AMR device to communicate with said remote location during said time periods.

19. The method of claim 18 wherein said information is collected only when a conflict arises between the use of said communication line by said automatic meter reader and its use by another user.

20. The method of claim 18 wherein said information is analyzed using an automatic neural network algorithm.

* * * * *